Figure 1:
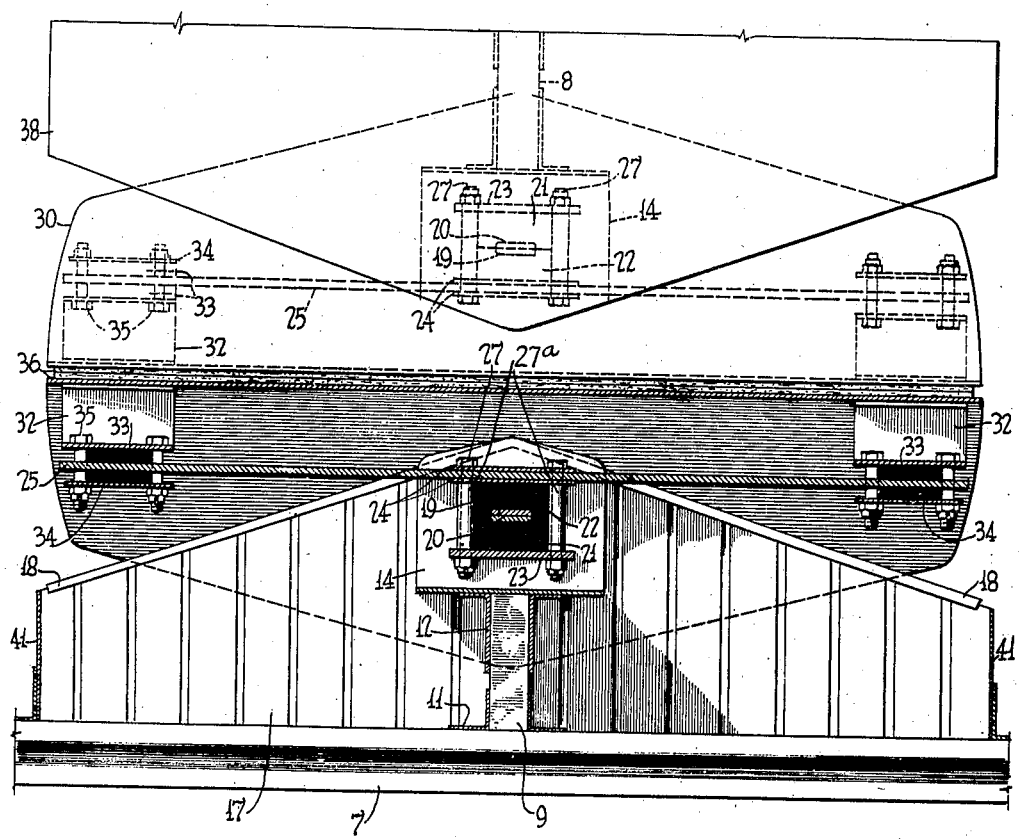

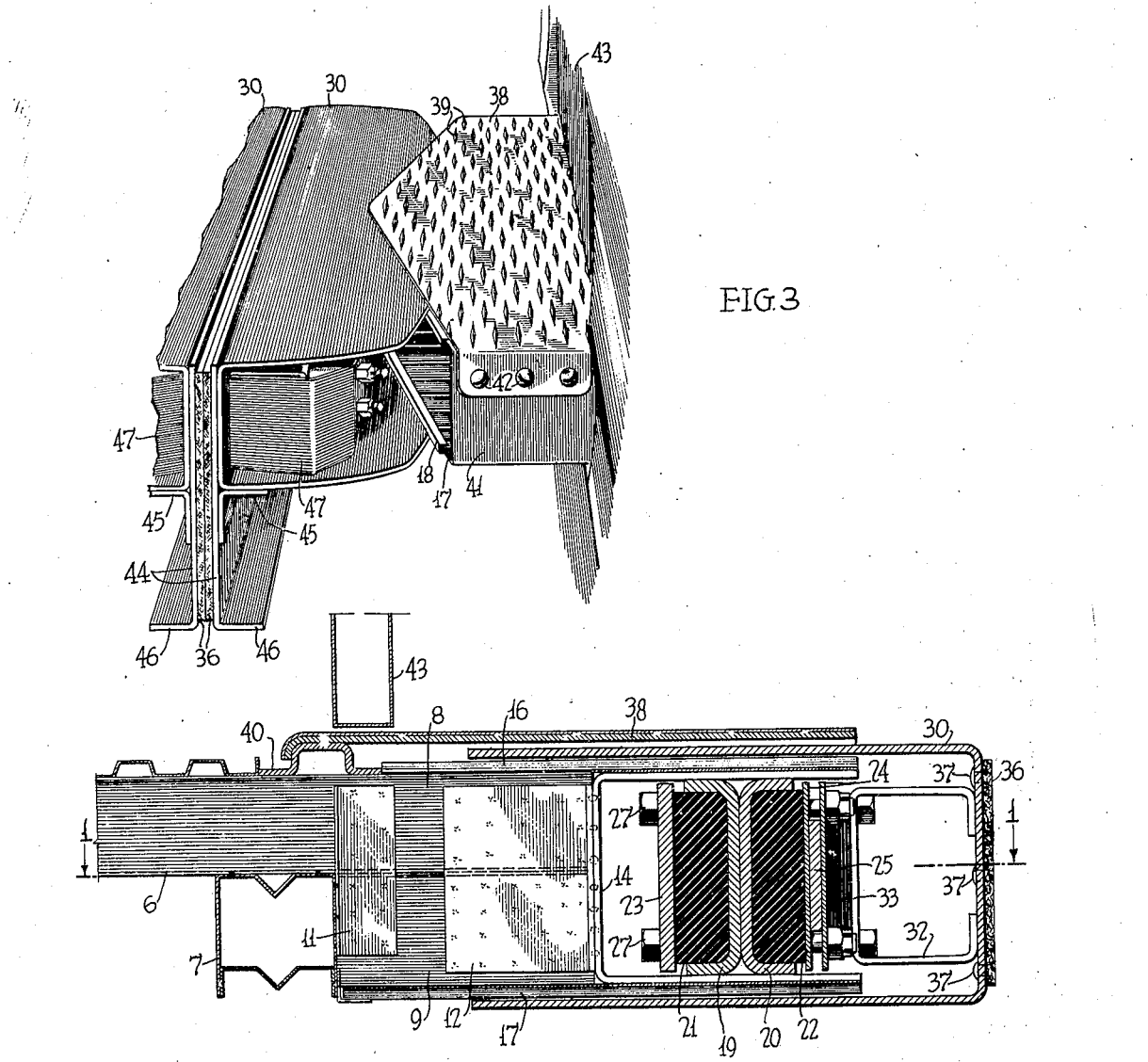

UNITED STATES PATENT OFFICE 2,128,221

VEHICLE WALKWAY STRUCTURE

Albert G. Dean, Narberth, Pa., assignor to Edward G. Budd Manufacturing Company, Philadelphia, Pa., a corporation of Pennsylvania Application December 6, 1933, Serial No. 701,106
Renewed December 12, 1936

9 Claims. (Cl. 105—458)

My invention is a walkway structure, particularly for disposition between the ends of adjoining cars of railway trains, for rendering such structure quiet and effective in operation, simple and durable in construction, economical to manufacture, adaptable to fabrication from sheet metal, compact, strong, of light weight, of ready assembly by spot welding, of reduced friction and otherwise improved character.

In a preferred form, a metal swing plate, is supported on a car body in rubber blocks to swing free from appreciable friction with adjacent parts; the plate being horizontal and of substantially U-shape having its closed end or side constituting an upright bumper face lined with a non-metallic layer, such as brake lining, whereby to reduce impact shocks, avoid metal to metal contact and provide a wear surface for cooperation with the corresponding surface of an adjacent vehicle.

The rubber-block suspension of the swing plate is effected through the intermediary of a leaf spring extending transversely of the vehicle; this spring being within the U-shaped plate, extending transversely of the vehicle, secured at its center to the car by rubber blocks and secured at its ends to the plate by rubber blocks. The rubber blocks and spring are of such flexibility as to permit a longitudinal movement as well as a swing of the plate through an arc adapting the device to the usual draw bar movement as well as track turns of standard railway practice. The upper and lower sides of the horizontal U-shaped swing plate are guided on the projecting portion of the car frame which includes plates having ribs to reduce the area of contact and friction with the swing plate. A depth extension of a longitudinal car-frame beam, a stationary floor plate over the swing plate, and other features are provided, as will be better understood from the following description and accompanying drawings.

Figure 1 of the drawings is a plan view of adjoining walkway structures of my invention, in their relation on different cars; one of the devices being in plan and the other in section along the line 1—1 of Fig. 2, Fig. 2 is an enlarged side view of one of the structures of Fig. 1, parts being in elevation and parts in section, and Fig. 3 is a perspective view of one of the structures including a slight modification to be herein explained, together with a portion of a corresponding similar structure.

Referring to Figs. 1 and 2, a central longitudinal car floor beam 6 rests on a transverse beam 7, preferably of box section, and has an end portion 8 projecting beyond the beam 7. A depth extension 9 of the end 8 is secured to the beams 7 and 8 by angle plates 11 and 12 that are spot welded or otherwise secured thereto. A sheet metal member 14 of U-shape is disposed with its bottom upright against the members 8, 9 and 12 to which it is secured, as by spot welding, and is provided, above and below, with substantially horizontal longitudinally ribbed plates 16 and 17, respectively, having sloping outer or transverse edges and secured to the members 8 and 9. Channelled liners 18, Fig. 1, embrace the sloping edges of the ribbed plates. Members 19 and 20, of substantially C-shape, are secured together at the longitudinal center line of the car, as by welding in back-to-back relation, and to the sides of the channel member 14 between which they fit.

Blocks 21 and 22, preferably relatively soft, live rubber, are disposed in the C-shaped members 19 and 20, respectively, a binder plate 23 is provided for the rear rubber block 21, and a pair of binder plates, 24 are provided for the front rubber block 22 and embrace a transverse leaf spring element 25.

The binder plates 23 and 24 are held to the rubber blocks 21 and 22 and to the leaf spring 25, as by bolts 27 carrying usual nuts, which bolts may be provided with sleeves 27ᵃ between the adjacent binders 23 and 24.

A swing plate element 30 is perferably of channel section having sloping transverse end edges and embracing the channel member 14 and the ribbed plates 16 and 17, the plate 30 is provided therein adjacent to its ends with loop members 32 preferably of strip stock of rectangular C-shape having ends welded to the bumper face of the swing plate 30 and flat portions constituting binders for rubber blocks 33, between which the ends of the leaf spring 25 are disposed. Other binder plates 34 and rubber blocks 33 are held to the loops 32 by bolts 35 and accompanying nuts, or nuts and lock washers or other members, as desired.

A non-metallic, bumper-face layer or sheet 36, preferably of material such as brake lining, is suitably secured to the swing plate 30, as by rivets 37, as shown in Fig. 2. A stationary horizontal plate 38, preferably having roughened portions, or tread elements, 39 thereon, is secured to a stationary portion 40 of the car floor adjacent to a car door 43, as shown in Fig. 2, and has depending flanges secured to sides 41 of the base, as by screws 42, as shown in Fig. 3.

The structure of Fig. 3 is similar to that of

Figs. 1 and 2, except that the bumper face of the swing plate is reinforced and augmented by an additional layer or plate 44 secured to the swing plate by welding and by a welded-on angle member 45, and also having a rearwardly-turned edge flange 46. The plate 44 projects a substantial distance below the swing plate to provide greater vertical bumper-face areas between adjoining swing plates of adjacent vehicles, thereby better stabilizing the device against perpendicular maladjustment between the floor surfaces of the adjacent swing plates. Extensions 47 are provided on the outer binder plate 34 to function as side shields and to improve the appearance of the structure.

In operation, instead of the loose pivoted relation of parts, as in prior art devices, or other action that is made loose by wear of parts, the effect in my device is more on the order of a bending or compressing action, in which the parts, although moved relatively by substantial amounts, still retain accurate relative positions throughout the movements. Shocks and vibrations are absorbed by the relatively massive rubber blocks and a certain amount of the displacing movements of the parts may be taken up in the strap or leaf spring 25.

The face liners 36 of the bumpers are preferably of a material like that employed as brake lining for automobiles; being thereby very tough and durable, and being readily renewable if necessary. This feature also, in which two such elements engage each other, as indicated in Figs. 1 and 3, lends materially to the quiet operation of the device both during running operation of connected vehicles and when the vehicles are being brought together, by absorbing the contact shock.

Although I have shown and described particular forms of my invention, changes may be effected therein without departing from the spirit and scope thereof, as set forth in the appended claims.

What I claim is:

1. In combination, in a car walkway structure, longitudinally spaced transverse support and swing plate members, an elongated transverse spring element therebetween spaced therefrom in its main body, means clamping said element adjacent to its ends to one of said members, said means each including rubber bodies between which the element is clamped, and means including a rubber body clamping the element between its ends to the other of said members.

2. A car walkway structure comprising a supporting yoke, an upright member rigidly mounted thereon between the arms of the yoke, rubber blocks of greater width than said upright member at opposite sides thereof, a binding plate for one of said blocks, a pair of binding plates for the other block, a transverse leaf spring between the plates of said pair, and binding members securing all of said plates together and holding the blocks against the upright member and the transverse leaf spring between the plates of said pair.

3. A car walkway structure comprising a support, an upright member rigidly mounted thereon, a resilient transverse element secured between its ends to said upright member, a swing plate constituting an extension of said walkway support, pairs of rubber blocks, the blocks of each pair being at opposite sides of said element adjacent to its ends, a binding plate for one of said blocks, a binding plate for the other block secured to the swing plate, and binding members securing said plates together to hold the blocks against the transverse element, said swing plate having a resilient movement with respect to said car walkway support.

4. In combination, a longitudinal car-floor beam, a transverse beam thereunder spaced from an end thereof, a member constituting a depth extension of the longitudinal beam between said end and said transverse beam, horizontal ribbed plates above and below the longitudinal beam and its said depth extension projecting therefrom beyond said end, a channel member between the plates having an upright bottom next to said end and said extension, back-to-back members of C-section in the channel having ends secured to its horizontal sides, rubber blocks in the C-members, a binder for the inner block, a pair of binders for the outer block, an elongated resilient strap between the binders of said pair, means binding the inner and outer block binders together, a metal channel member having horizontal sides embracing the ribbed plates, a nonmetallic bumper-face layer on said metal member, loops in the channel of said metal member secured one adjacent to each end thereof, plates opposite the loops, rubber blocks between the strap and said plates and between the strap and the loops, and means binding said plates to the loops.

5. A car walk-way structure comprising transverse support and swing plate members, a transverse leaf spring arranged edgewise in a vertical plane and clamped adjacent its ends to one of said members and centrally to the other of said members, the end clamps at least comprising rubber cushions, whereby angular and endwise movement of the spring with respect to the member to which its ends are clamped is permitted through distortion of said cushions, the rubber cushions biasing the spring and member to return to their normal relation.

6. A car walk-way structure comprising transverse support and swing plate members, a transverse leaf spring arranged edgewise in a vertical plane and clamped adjacent its ends to one of said members and centrally to the other of said members, the central clamp at least comprising a rubber cushion, whereby angular and endwise movement of the spring with respect to the member to which its central portion is clamped is permitted through distortion of said cushion, the rubber cushion biasing the spring and member to return to their normal relation.

7. A car walk-way structure comprising transverse support and swing plate members, a transverse leaf spring arranged edgewise in a vertical plane and clamped adjacent its ends to one of said members and centrally to the other of said members, all of said clamps comprising rubber cushions permitting angular and longitudinal movement of the spring with respect to said members through distortion of the rubber cushions, the rubber cushions biasing the spring and members to return to their normal relation.

8. A car walkway structure comprising transversely extending relatively movable members one of which is a fixed part of the car body, the other of which constitutes a swing plate having a vertical face arranged to contact a corresponding face of a corresponding swing plate on an adjacent car, together with a transversely extending leaf spring arranged edgewise to the vertical and operating in a horizontal plane to retain said members longitudinally spaced apart, said leaf spring being provided with connections to said relatively movable members yieldable in a horizontal plane and providing relative lateral alignment and a degree of angular movement of the spring and swing plate with respect to the car body, so that said swing plate maintains surface contact throughout its vertical face with the swing plate of an adjacent car regardless of angularity between the cars.

9. A car walkway structure having in combination with an outwardly projecting threshold portion fixedly carried by an end of a car, a swing plate extending the threshold plate outwardly and movably secured with respect to the threshold plate and having a vertical bumper face adapted to cooperate with a corresponding face of a swing plate of an adjacent car, and means to support said swing plate and to yieldingly maintain its bumper face in contact with the face plate of an adjacent car regardless of angularity between the cars, said means including a transversely extending leaf spring arranged edgewise to the vertical and having a plurality of flexible attachments at its ends to said swing plate and a similar attachment intermediate its ends to the outwardly projecting threshold portion so that said swing plate has limited lateral and angular movement with respect to said threshold portion.

ALBERT G. DEAN.